Oct. 23, 1928.  1,689,096
C. F. WRAY ET AL
MEASURING FAUCET
Filed May 5, 1926     3 Sheets-Sheet 1
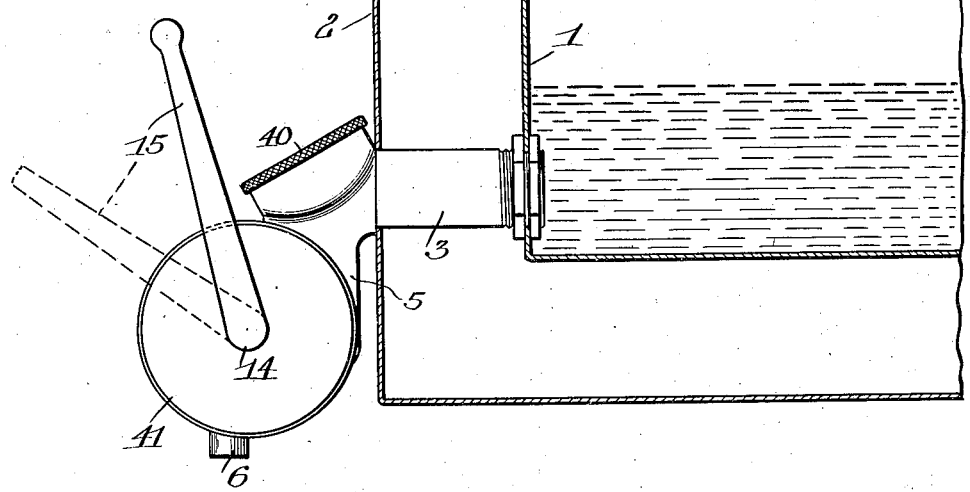
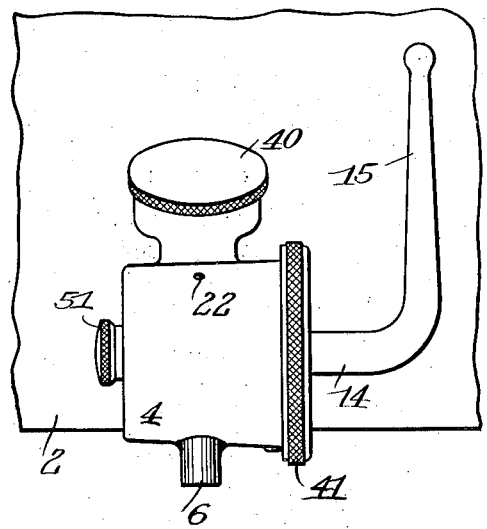
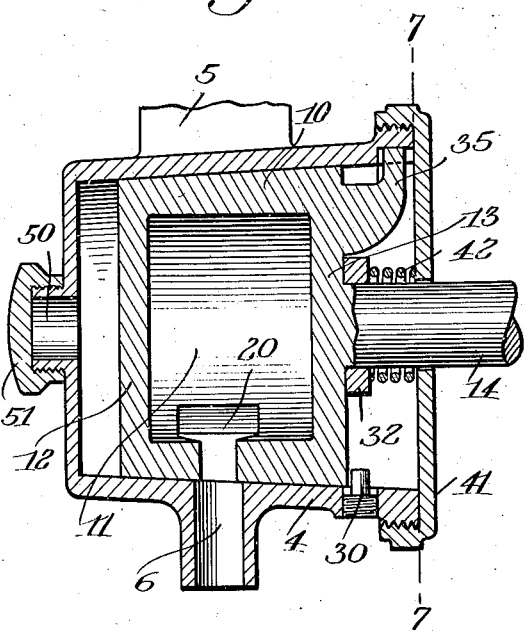
INVENTORS
Charles F. Wray
Manuel Blickman
Harold E. Stonebraker
their ATTORNEY Oct. 23, 1928.　　　　1,689,096
C. F. WRAY ET AL
MEASURING FAUCET
Filed May 5, 1926　　　3 Sheets-Sheet 3
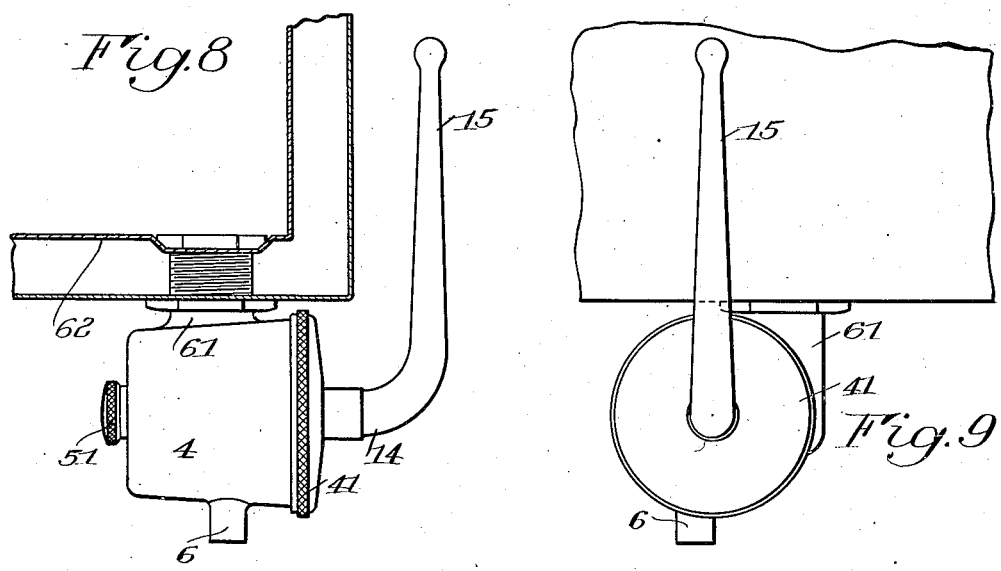
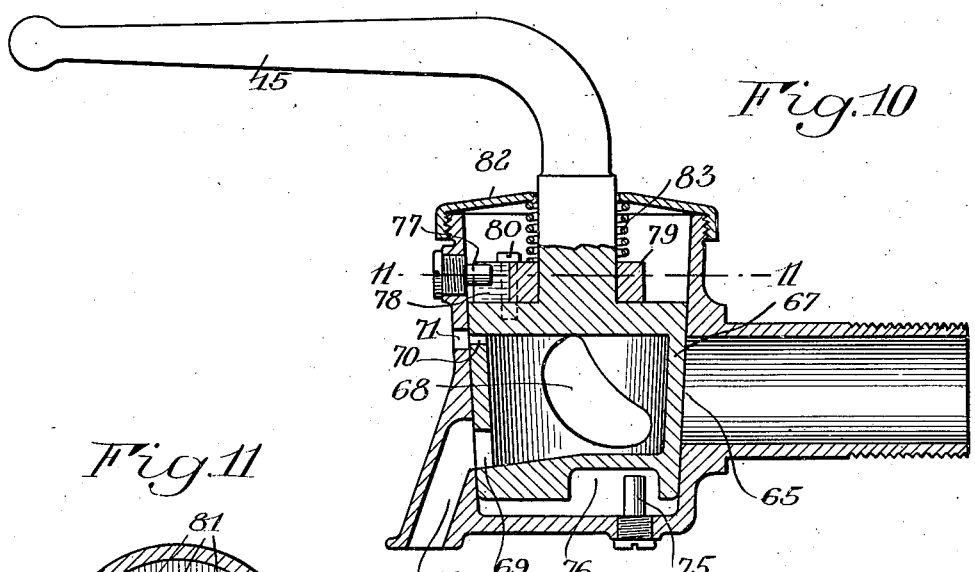
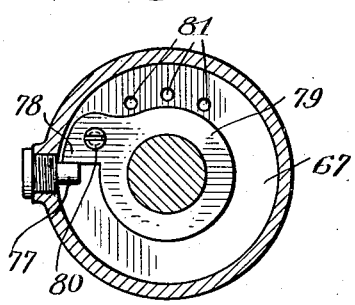
Inventors
Charles F. Wray
Manuel Blickman
By Harold E. Stonebraker,
their Attorney Patented Oct. 23, 1928.

1,689,096

UNITED STATES PATENT OFFICE.

CHARLES F. WRAY, OF ROCHESTER, NEW YORK, AND MANUEL BLICKMAN, OF WEEHAWKEN, NEW JERSEY, ASSIGNORS TO SAUL BLICKMAN, MANUEL BLICKMAN, AND HARRY BLICKMAN.

MEASURING FAUCET.

Application filed May 5, 1926. Serial No. 106,872.

The invention relates to a measuring faucet, and is intended more particularly for dispensing predetermined quantities of milk or cream in restaurants and similar uses.

A principal object of the invention is to afford a measuring faucet having few and simple parts and which can be economically manufactured.

A further object of the invention is to provide a structure that can be readily cleaned and kept in sanitary condition, while also insuring accurate measuring of the dispensed liquid.

Still another purpose of the invention is to afford an arrangement that permits a quick and ready adjustment for changing the amount of liquid dispensed.

An additional and important purpose of the improvement is to provide means that permits of quickly emptying the receptacle to which the valve is connected at the end of a day so as to make it possible to effect a thorough cleansing of the parts.

To these ends, the invention comprises the construction that will appear clearly from the following description when read in conjunction with the accompanying drawings, the novel features being pointed out in the claims at the end of the specification.

In the drawings:

Figure 1 is a side elevation of a measuring faucet constructed in accordance with one practical embodiment of our invention and showing its application to a tank or receptacle, which appears in section;

Figure 2 is a front elevation;

Figure 3 is a longitudinal vertical sectional view taken centrally;

Figure 8 is a side elevation, partly in section, showing the invention as applied to the bottom of a tank or container instead of at one side thereof, as in the form shown in the preceding views;

Figure 9 is an end elevation of the same;

Figure 10 is a vertical sectional view of a further modification of the invention illustrating a possible arrangement with the rotary axis of the valve disposed vertically instead of horizontally, and Figure 11 is a horizontal sectional view on the line 11—11 of Figure 10.

Figure 5:
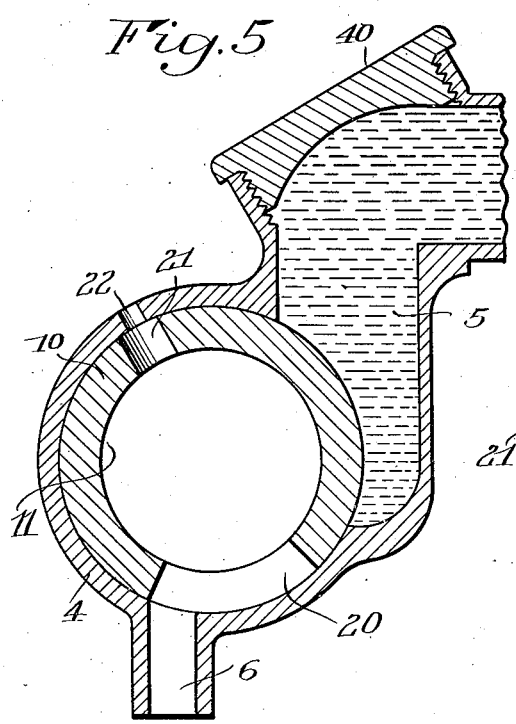
Figure 5 is a similar view showing the position of the valve when discharging.

The novel and advantageous features of the invention may be carried out in a number of different ways, and it is to be understood that the structures shown are intended only as examples of various practical adaptations.

In Figures 1 to 7, inclusive, 1 and 2 designate the interior and exterior walls respectively of a tank or receptacle that receives a neck 3 forming part of the faucet and which serves to conduct liquid from the interior of the tank to the valve.

The neck 3 is preferably formed integral with the valve housing 4, communicating with the body portion thereof by a vertical passage 5, terminating in an inlet port through which liquid enters the valve when filling, while 6 is an outlet port in the valve housing through which liquid is discharged.

The valve employed is preferably of conical type, as shown at 10, the body of the housing being correspondingly shaped, and the valve includes a hollow interior 11 and closed ends 12 and 13, while 14 is a post preferably formed integral with the valve and terminating in an operating handle 15. The valve includes a port 20 which in the embodiment shown functions alternately as a filling and discharging port. When the valve is turned to the position shown in Figure 4, liquid flows into the valve through the port 20 until it reaches the level shown, and when the valve is turned to the position shown in Figure 5, bringing port 20 into registry with port 6, the liquid is discharged through the latter.

Figure 4:
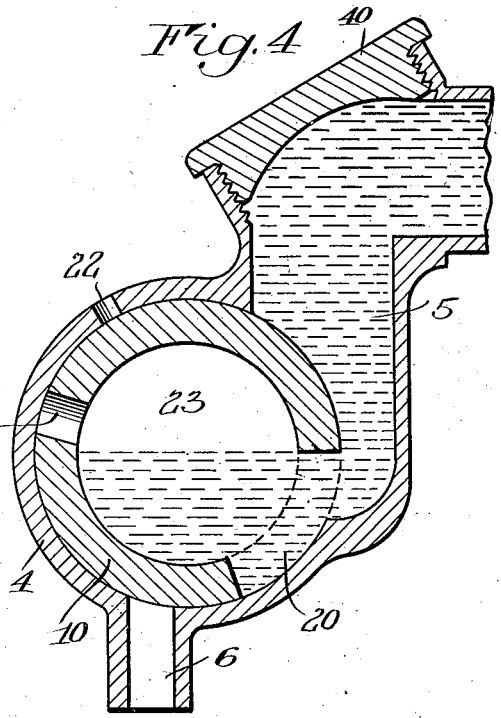
Figure 4 is a transverse vertical sectional view showing the position of the valve while filling.

21 is a second port in the valve adapted to register with an air vent 22 when the valve is in discharging position, as in Figure 5, and to engage a closed part of the valve housing when the valve is filling, as in Figure 4. When the valve is in filling position, it is air tight, and flow of liquid into the valve is limited by the body of air that is trapped within the air chamber 23 of the valve, and which cannot escape.

The amount of liquid that flows into the valve when filling is determined by the position of port 20, and the corresponding size of air chamber 23. If the valve is turned so as to expose more of port 20 to the inlet port of the valve housing than illustrated in Figure 4, it would reduce the size of air chamber 23 and permit a larger volume of liquid to flow into the valve, whereas if the valve was turned so as to expose less of port 20 to the inlet port of the valve housing than illustrated in Figure 4, it would afford a larger air chamber 23 and permit less liquid to flow into the valve.

The amount of liquid that is measured is predetermined by stops that limit the turning movement of the valve to a definite point each time it is operated, one of such stops being adjustable in order to vary the amount of liquid that is measured and discharged. A preferred arrangement for accomplishing this includes a stop 30 on the valve housing consisting of a pin threaded into the housing and lying in the path of a stop 31 carried by the valve. The stop 31 is preferably formed as part of a collar 32, mounted on post 14 and held in adjusted position by set screw 33 engaging any one of a series of openings 34 formed in the adjacent wall of the valve.

By changing the position of stop 31 on the valve with reference to adjusting openings 34, the amount of throw of the valve can be changed, thus varying the amount of liquid that is dispensed at each operation of the valve. 35 is a second stop fixed upon the valve and cooperating with shoulder 36 to limit movement of the valve toward discharging position, while stop 31 engages stop 30 to limit movement of the valve toward filling position.

Figure 6:
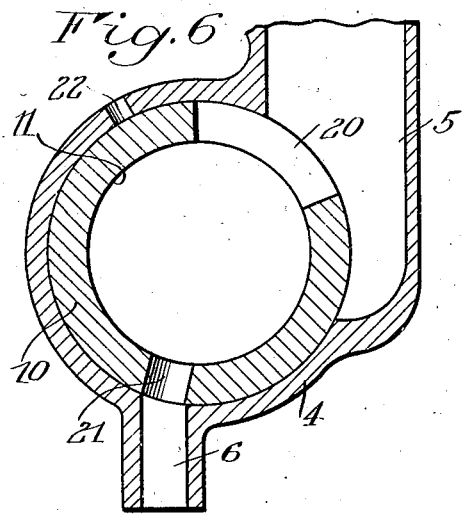
Figure 6 is a similar view showing the position of the valve when emptying the container.
Figure 7:
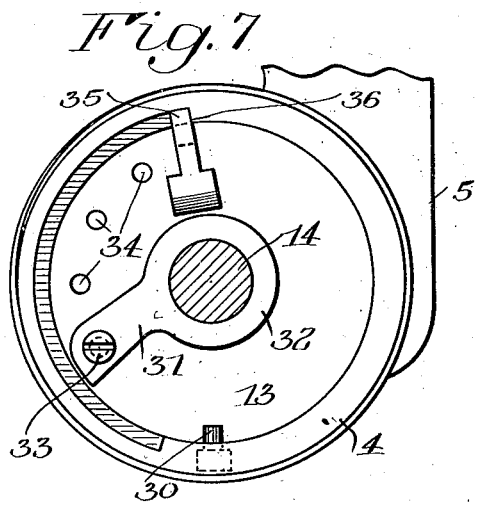
Figure 7 is a sectional view on line 7—7 of Figure 3.

When it is desired to quickly empty the tank without the measuring operation, as for instance at the end of a day when it is necessary to clean the tank, stop 30 is withdrawn from the housing by unscrewing until it is out of the path of stop 31, permitting the valve to be turned beyond its normal position until it occupies the relation shown in Figure 6 with port 21 registering with the discharging port 6. In this position, liquid from the tank flows into the valve through port 20 and immediately passes out through port 21 and opening 6, permitting a quick discharge of the contents of the tank.

The housing is provided with a suitable opening at the top that is normally closed by a cap 40, removal of which permits ready access to the neck 3 and vertical passage 5 for cleaning. The valve is held in normal operative position by a cap 41 having threaded engagement with the housing, while 42 is a spring located between the cap 41 and collar 32 and acting to hold the collar 32 and valve 10 in proper position within the housing. The valve housing may be provided with an opening 50 at its opposite end normally closed by a threaded cap 51, to permit access to the interior of the valve housing when the valve is in position, if necessary.

In operation, when handle 15 is swung downwardly to the position shown in dotted lines in Figure 1, the valve takes the position shown in Figure 4 and is filling. When the liquid reaches the level in the valve determined by the position of the upper end of port 20, no more liquid can flow in, since there is no escape for the air in chamber 23. Then by swinging handle 15 to the position shown in full lines in Figure 1, the valve moves to the position shown in Figure 5, closing the inlet port from tank 1 and bringing port 20 into registry with outlet port 6, while at the same time port 21 registers with air vent 22, and the liquid within the valve is then discharged through outlet port 6. The amount of liquid that is measured and discharged by valve 10 is determined by the adjustment of stop 31 which is fixed according to the particular need of the user, and when it is desirable to empty the tank without measuring, stop 30 is withdrawn, freeing the stop 31 for movement, and permitting the valve to be turned to the position shown in Figure 6.

The structure shown in Figures 8 and 9 is similar in principle and operation to that already described, the only difference being that the horizontal neck 3 is omitted, and the vertical portion 61 is connected directly with the bottom 62 of the container. In some cases, this arrangement may be preferred, as it permits a more complete draining of the tank than with the arrangement shown in Figure 1.

Figures 10 and 11 disclose a structure that is also similar in principle and operation to that already described, the principal difference being that the valve is arranged to turn about a vertical axis. In this modification, 65 designates the inlet port of the valve housing and 66 is the outlet port for the same. 67 designates a hollow valve including a filling port 68 which is shaped substantially as shown, with the lowermost portion thereof approximately on a level with or slightly beneath the bottom of inlet passage 65. 69 designates an outlet port in the valve, while 70 is an air inlet adapted to communicate with the vent 71 when the valve is turned to the position shown in Figure 10 to permit discharge of its contents.

The amount of liquid that is measured and discharged depends upon the extent to which the valve is turned, and the height to which the port 68 is exposed to the inlet port 65. The degree of turning of the port 68 determines the amount of liquid received by the valve, owing to the body of air trapped within the valve above the highest exposed portion of the port 68. 75 designates a stop at the bottom of the valve housing cooperating with a recess 76 in the bottom of the valve and acting normally to limit movement of the valve to discharging position. 77 is a stop arranged at the top of the housing and cooperating with an adjustable abutment 78 to limit movement of the valve to filling position. The abutment 78 is part of a ring 79 which is held in adjusted position on the top of the valve by a set screw 80 cooperating with one of a series of openings 81. 82 is a threaded cap engaging the top of the valve housing, and 83 is a spring positioned between the underside of the cap 82 and the top of ring 79 and acting to hold the valve down in proper relationship to the valve housing.

While we have described the invention in accordance with a particular disclosure, it is not confined to the precise details or arrangement herein set forth, and this application is intended to cover any modifications or departures coming within the intended purposes of the invention or the scope of the following claims.

We claim:

1. The combination with a valve housing including inlet and outlet ports, of a hollow valve having a filling and discharging opening and movable to place said opening alternately in communication with said inlet and outlet ports, the valve when filling being arranged with the top of said opening below the top of the valve affording an air chamber above the top of said opening, and means for varying the extent of movement of the valve and the position of the top of said opening to determine the amount of liquid that enters.

2. The combination with a valve housing including inlet and outlet ports, of a hollow rotary valve having a filling and discharging opening and rotatable to place said opening alternately in communication with said inlet and outlet ports, the valve when filling being arranged with the top of said opening below the top of the valve affording an air chamber above the top of said opening, and means for varying the extent of rotation of the valve and the position of the top of said opening to determine the amount of liquid that enters.

3. The combination with a valve housing including inlet and outlet ports, of a hollow rotary valve having a filling and discharging opening and rotatable to place said opening alternately in communication with said inlet and outlet ports, the valve when filling being arranged with the top of said opening below the top of the valve affording an air chamber above the top of said opening, and means for varying the extent of rotation of the valve and the position of the top of said opening to determine the amount of liquid that enters, and cooperating relatively adjustable stops on the valve and housing for limiting movement of the valve.

4. The combination with a valve housing including inlet and outlet ports, of a hollow rotary valve having a filling and discharging opening and rotatable to place said opening alternately in communication with said inlet and outlet ports, the valve when filling being arranged with the top of said opening below the top of the valve affording an air chamber above the top of said opening, and means for varying the extent of rotation of the valve and the position of the top of said opening to determine the amount of liquid that enters, said valve having a second opening moveable to communicate with an air vent in the housing when the filling and discharging opening is in communication with the outlet port.

5. The combination with a valve housing including inlet and outlet ports, of a hollow rotary valve having a filling and discharging opening and rotatable to place said opening alternately in communication with said inlet and outlet ports, the valve when filling being arranged with the top of said opening below the top of the valve affording an air chamber above the top of said opening, and means for varying the extent of rotation of the valve and the position of the top of said opening to determine the amount of liquid that enters, said valve having a second opening movable to communicate with an air vent in the housing when the filling and discharging opening is in communication with the outlet port, and cooperating relatively adjustable stops on the valve and housing for limiting movement of the valve.

6. The combination with a valve housing including inlet and outlet ports, of a hollow rotary valve having a filling and discharging opening and rotatble to place said opening alternately in communication with said inlet and outlet ports, the valve when filling being arranged with the top of said opening below the top of the valve affording an air chamber above the top of said opening, and means for varying the extent of rotation of the valve and the position of the top of said opening to determine the amount of liquid that enters, said valve having a second opening movable to communicate with an air vent in the housing when the filling and discharging opening is in communication with the outlet port and also to communicate with the outlet port when the filling opening is in communication with the inlet port.

7. The combination with a valve housing including inlet and outlet ports, of a hollow rotary valve having a filling and discharging opening and rotatable to place said opening alternately in communication with said inlet and outlet ports, the valve when filling being arranged with the top of said opening below the top of the valve affording an air chamber above the top of said opening, and means for varying the extent of rotation of the valve and the position of the top of said opening to determine the amount of liquid that enters, said valve having a second port movable to communicate with an air vent in the housing when the filling and discharging opening is in communication with the outlet port, and also to communicate with the outlet port when the filling opening is in communication with the inlet port, and cooperating relatively adjustable stops on the housing and valve for limiting movement of the latter, one of said stops being removable to permit turning the valve to bring said second opening into communication with the outlet port of the housing.

8. The combination with a valve housing having an inlet port and an outlet port, of a hollow valve having a filling opening communicating alternately with said inlet and outlet ports and normally located when filling below the top of the valve, the position of the top of the filling opening with reference to the inlet port of the housing determining the amount of liquid that enters the same.

9. A liquid dispensing device comprising a casing having an inlet and an outlet, a hollow valve within said casing, said valve being provided with a port and movable to place said port alternately in communication with said inlet and outlet, said inlet being arranged so that the position of the port with respect to the inlet will determine the amount of liquid trapped within said valve.

10. The combination with a casing having inlet and outlet openings, of a hollow rotatable valve within said casing provided with port means adapted to communicate alternately with said inlet and outlet openings of the casing, said port means being so arranged that its angular position with respect to said inlet opening will determine the level of liquid trapped within said hollow valve.

11. A measuring device comprising a shell having inlet and outlet openings, a rotary chamber within said shell having a port adapted to communicate alternately with said inlet and outlet openings, the inlet opening being positioned in the wall of the shell so that the angular position of the port in the chamber will determine the amount of liquid trapped within said chamber.

12. A liquid dispensing device comprising a casing having an inlet and an outlet, a hollow valve within said casing, said valve being provided with a port and movable to place said port alternately in communication with said inlet and outlet, the inlet being so positioned in the wall of the casing that the position of the port in the valve relative to the inlet will determine the quantity of liquid admitted to the valve.

13. A liquid dispensing device comprising a casing having an inlet and an outlet, a hollow valve within said casing, said valve being provided with a port and movable to place said port alternately in communication with said inlet and outlet, the inlet being so positioned in the wall of the casing that the position of the port with respect to the inlet will determine the quantity of liquid admitted to the valve, said valve and casing having cooperating air inlets registering when said port is in register with the outlet of the casing.

14. A liquid measuring device comprising a casing, walls forming a cavity within said casing, one of said walls having an opening therein and being adjustable to permit filling the cavity approximately to the level of the top of said opening and below the top of the cavity, the elevation of the top of said opening with respect to the top of said cavity determining the amount of liquid received in the cavity.

15. The combination with a casing having inlet and outlet openings and an air vent therein, of a hollow member movable within said casing, said member having two ports only therein, one of said ports being movable to register with said outlet opening when the second port registers with the air vent, and said first port being movable to register with said inlet opening when said second port is moved to register with said outlet opening.

In witness whereof, we have hereunto signed our names.

CHARLES F. WRAY.
MANUEL BLICKMAN.